(12) United States Patent
Bazzo

(10) Patent No.: US 9,440,386 B2
(45) Date of Patent: Sep. 13, 2016

(54) APPARATUS FOR INJECTION MOLDING OF PLASTIC MATERIAL

(71) Applicant: INGLASS S.p.A., San Polo di Piave (TV) (IT)

(72) Inventor: Maurizio Bazzo, San Polo di Piave (IT)

(73) Assignee: INGLASS S.p.A., San Polo di Piave (TV) (IT)

( * ) Notice: Subject to any disclaimer, the term of this patent is extended or adjusted under 35 U.S.C. 154(b) by 0 days.

(21) Appl. No.: 14/616,828

(22) Filed: Feb. 9, 2015

(65) Prior Publication Data
US 2016/0107352 A1 Apr. 21, 2016

(30) Foreign Application Priority Data
Oct. 15, 2014 (IT) .............................. TO2014A0838

(51) Int. Cl.
| | | |
|---|---|---|
| B29C 45/22 | (2006.01) | |
| B29C 45/23 | (2006.01) | |
| B29C 45/28 | (2006.01) | |
| B29C 45/17 | (2006.01) | |

(52) U.S. Cl.
CPC ........... *B29C 45/231* (2013.01); *B29C 45/281* (2013.01); *B29C 45/1744* (2013.01); *B29C 2045/282* (2013.01); *B29C 2045/2824* (2013.01)

(58) Field of Classification Search
CPC ................ B29C 2045/282; B29C 2045/2813; B29C 2045/2817; B29C 2045/2824; B29C 45/281
USPC .................................................. 425/564, 566
See application file for complete search history.

(56) References Cited

U.S. PATENT DOCUMENTS

| | | | | |
|---|---|---|---|---|
| 4,212,627 A | * | 7/1980 | Gellert | B29C 45/281 222/505 |
| 4,406,609 A | * | 9/1983 | Gellert | B23P 15/00 425/548 |
| 4,712,995 A | * | 12/1987 | Basnett | B29C 45/281 425/562 |
| 5,067,893 A | * | 11/1991 | Osuna-Diaz | B29C 45/281 251/250 |
| 5,141,696 A | | 8/1992 | Osuna-Diaz | |
| 2011/0293774 A1 | | 12/2011 | Scheffer | |
| 2013/0316036 A1 | * | 11/2013 | Metz | B29C 45/281 425/150 |

FOREIGN PATENT DOCUMENTS

| | | |
|---|---|---|
| DE | 102011106606 A1 | 12/2012 |
| DE | 102012003574 A1 | 5/2013 |

(Continued)

OTHER PUBLICATIONS

European Search Report and Written Opinion for Application No. EP15153168 mailed Jun. 16, 2015, 6 pages.

(Continued)

*Primary Examiner* — Jill Heitbrink
(74) *Attorney, Agent, or Firm* — Remarck Law Group PLC

(57) ABSTRACT

An apparatus for injection molding of plastic materials includes an injection machine platen, a mold including a backing plate for securing the mold to the injection machine platen, a distributor of the plastic material to be injected adjacent to the backing plate and bearing at least one injector including a nozzle within which a pin valve is axially movable, and a respective electric actuator with associated transmission to operate the displacement of the pin valve between a closed position and an open position. The transmission includes a variable-length connecting rod.

12 Claims, 15 Drawing Sheets

(56) References Cited

FOREIGN PATENT DOCUMENTS

| | | |
|---|---|---|
| JP | H07223241 A | 8/1995 |
| JP | H08174605 A | 7/1996 |

OTHER PUBLICATIONS

Italian Search Report and Written Opinion for Application No. IT TO20140838 mailed Jun. 8, 2015, 6 pages.

* cited by examiner

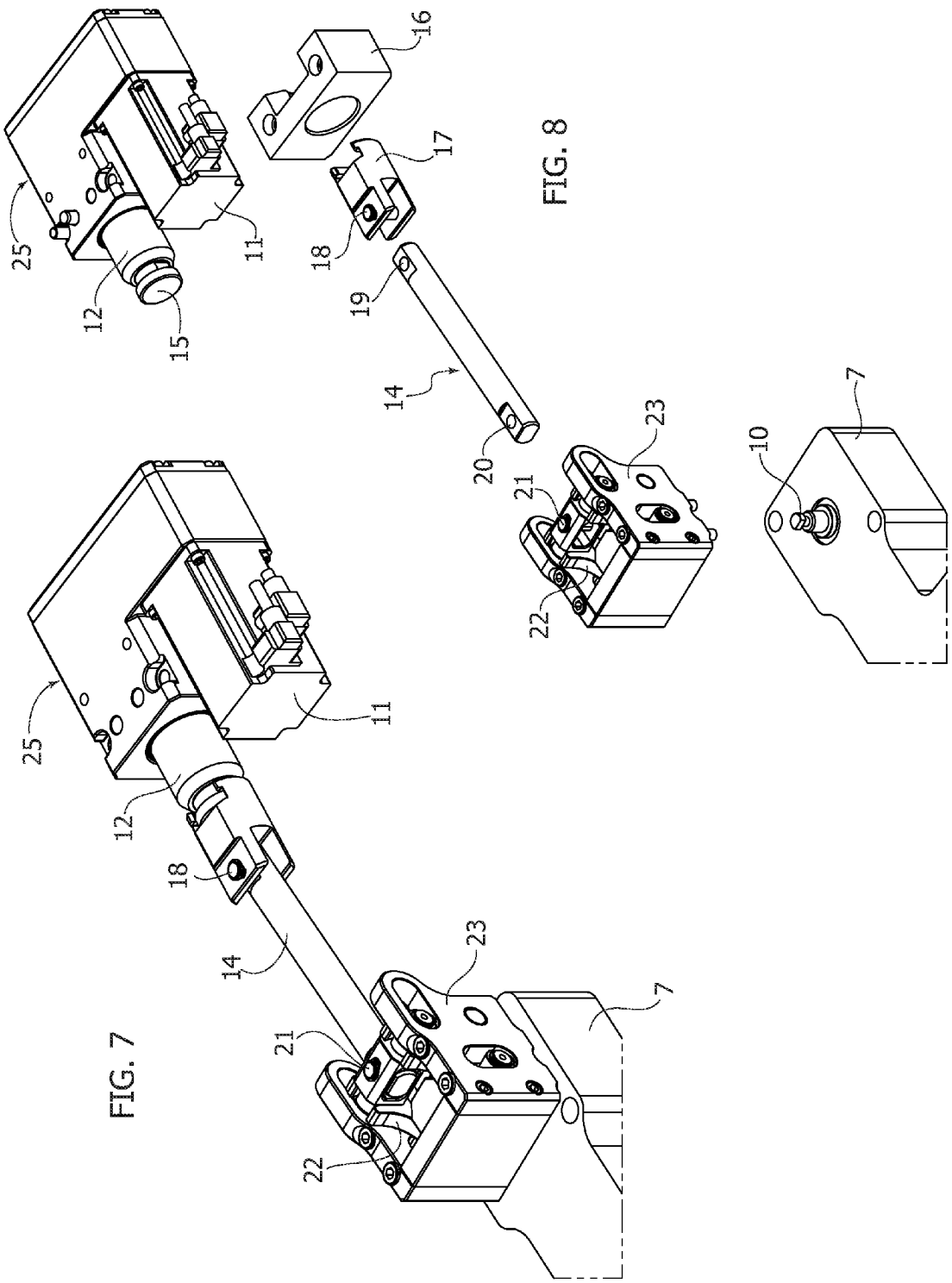

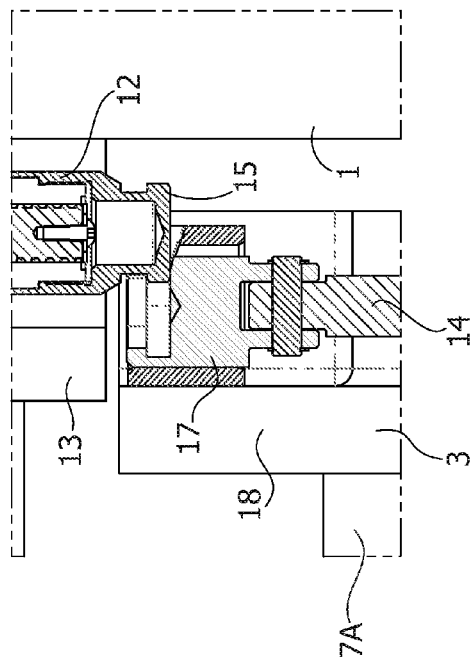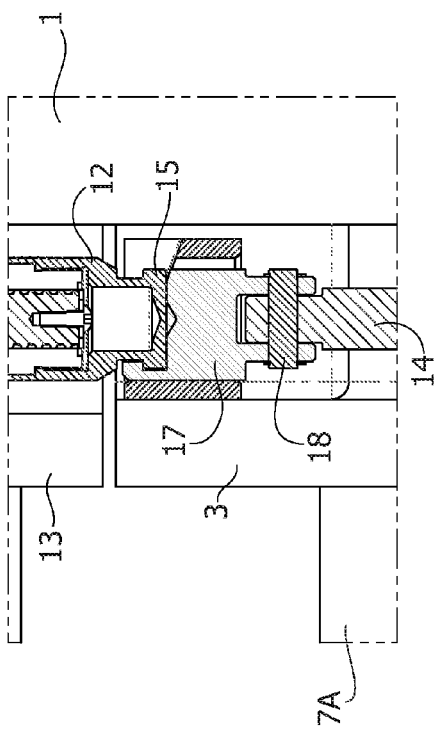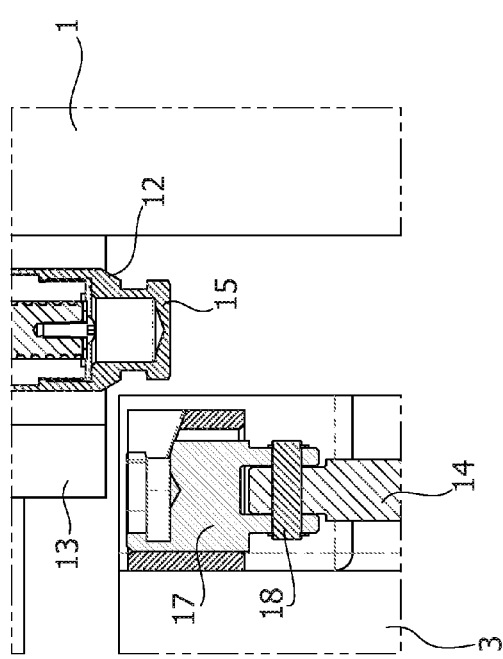

ized part of claim 1, whose unique characteristic lies in the
APPARATUS FOR INJECTION MOLDING OF PLASTIC MATERIAL

CROSS REFERENCE TO RELATED APPLICATIONS

This application claims priority to Italian Patent Application No. TO2014A000838 filed on Oct. 15, 2014, the entire disclosure of which is incorporated herein by reference.

FIELD OF THE INVENTION

The present invention relates to apparatuses for injection molding of plastic materials including an injection machine platen and a mold with a backing or clamping plate for securing the mold to the injection machine platen, a distributor of the plastic material to be injected, bearing at least one injector including a nozzle within which a pin valve is axially displaceable, and a or a respective actuator to operate the displacement of the pin valve between a closed position and an open position to enable fluid plastic material under pressure to flow from the distributor to the cavity of the mold.

In particular, the invention relates to such a molding apparatus in which the operation of the pin valve of the or of each injector is achieved through one or a respective rotary electric motor with associated transmission to convert rotation of the electric motor shaft into a translation of the pin valve.

STATE OF THE PRIOR ART

The use of electric motors, compared to systems that use fluid actuators (hydraulic or pneumatic), has the advantage of ensuring a direct, and therefore more accurate, electronic control in relation to the position of the pin valve as well as to its speed of movement during opening and closing.

The use of rotary electric motors, each associated with a respective injector, is described, for example, in European patent application EP-2679374A1 by the same Applicant: the assembly formed by the rotary electric motor and by the relative transmission, including a screw-and-nut assembly, is in this case, carried by a support directly fixed to the distributor, according to several possible configurations.

In order to thermally decouple the electric actuators (of the rotary or linear type) from the distributor, it has been proposed, for example, in documents U.S. Pat. No. 7,018,198, WO-2010/126330, U.S. Pat. No. 8,091,202 and U.S. Pat. No. 8,282,388, to apply them to the backing plate of the mold. A unique solution of this type forms the subject of European patent application no. 14170508.7 by the same Applicant, not published at the date of filing the present application, in which each rotary electric motor is housed in a rapidly insertable and disengageable manner within a respective seat of the backing plate, laterally with respect to the corresponding injector.

These solutions, although advantageous, do not allow the complete suppression of the thermal effects to which the electric motors are subjected to, due to the high temperatures of the distributor, except through the conditioning system of the backing plate of the mold, to ensure efficient cooling of the electric motors.

The electric motors are typically housed in seats provided in the immediate proximity of the relative injectors and therefore at the mold cavity, which can cause deformations that result in defects of the molded articles.

Furthermore, applying the electric motors can make the mold relatively complicated as a whole, and therefore expensive, also regarding the difficulties of installing the relative electrical cables, with the consequent encumbrances.

SUMMARY OF THE INVENTION

The object of the invention is to overcome the above drawbacks, and this object is achieved thanks to an apparatus for injection molding as defined in the pre-characterizing part of claim 1, whose unique characteristic lies in the fact that the aforesaid transmission includes a variable-length connecting rod.

Thanks to this solution idea, the housings for the electric actuators can also advantageously be provided on the outside of the mold, and in any case in remote positions with respect to its cavity, thus appreciably reducing the risk of deformations, which could involve defects of the molded articles. This advantageous effect is particularly relevant in the case of apparatuses for the molding of large parts, such as panels for the automotive industry, by means of a plurality of injectors operated sequentially or in cascade.

According to alternative embodiments, the or each electric actuator is carried by the injection machine platen, or by the backing plate of the mold. In the first case, there is the additional advantage that for operating the injectors, in practice, a unit or a group of units is configured independently from the mold and is usable, in general, with different molds, adequately arranged for coupling with this unit through the connecting rods, whose lengths are selected according to the arrangement and the distance of the injectors carried by the distributor.

The invention therefore has an important series of advantages, summarized below:

- possibility of use in molds of filling injection systems separated from the actuators, and therefore simpler and cheaper;
- greater rigidity of the overall structure of the mold, thanks to the fact that the backing plate does not have to be formed with recesses for housing the actuators;
- further simplification of the mold due to the absence of electrical cables for controlling the actuators;
- total suppression of the thermal effects deriving from the high temperature of the distributor, with consequent elimination of the need for a conditioning system for cooling the electric actuators;
- reducing the risk of damage to the electric actuators in the event of leakage of plastic material from the distributor; and
- ease of operation of the injectors, which can also be inclined to the axis of the apparatus.

According to a particularly advantageous embodiment of the invention, the or each electric actuator is a rotary electric motor and the transmission comprises a screw-and-nut assembly to convert rotation of the electric motor shaft into a translation, and a rocker lever driven by the nut of the screw-and-nut assembly, through the variable-length connecting rod, to displace the pin valve of the injector. With this arrangement, in which the rotary electric motor/screw-and-nut assembly unit is essentially analogous to that described and illustrated in the already cited document EP-2679374A1, the variable-length connecting rod is advantageously connectable to the nut through quick-hooking means, which ensure rapid installation on the apparatus. These quick-hooking means can be configured so as to allow the transmission of the motion from the rotary electric motor to the connecting rod along a direction non-parallel to the axis of the screw-and-nut assembly, but more conveniently, the connecting rod is axially aligned with the screw-and-nut assembly and with the rocker lever. To this effect, the invention envisages that the rotary electric motor and the screw-and-nut assembly form a selectively movable and orientable unit.

BRIEF DESCRIPTION OF THE DRAWINGS

Further characteristics and advantages of the invention will become apparent from the detailed description that follows, with reference to the attached drawings provided purely by way of non-limiting example, in which:

FIG. 7 is a perspective view of a component of the molding apparatus;

FIG. 8 is an exploded view of FIG. 7;

FIGS. 9A-9C exemplify the assembly modes of a detail of the molding apparatus;

DETAILED DESCRIPTION OF THE INVENTION

Figure 1:
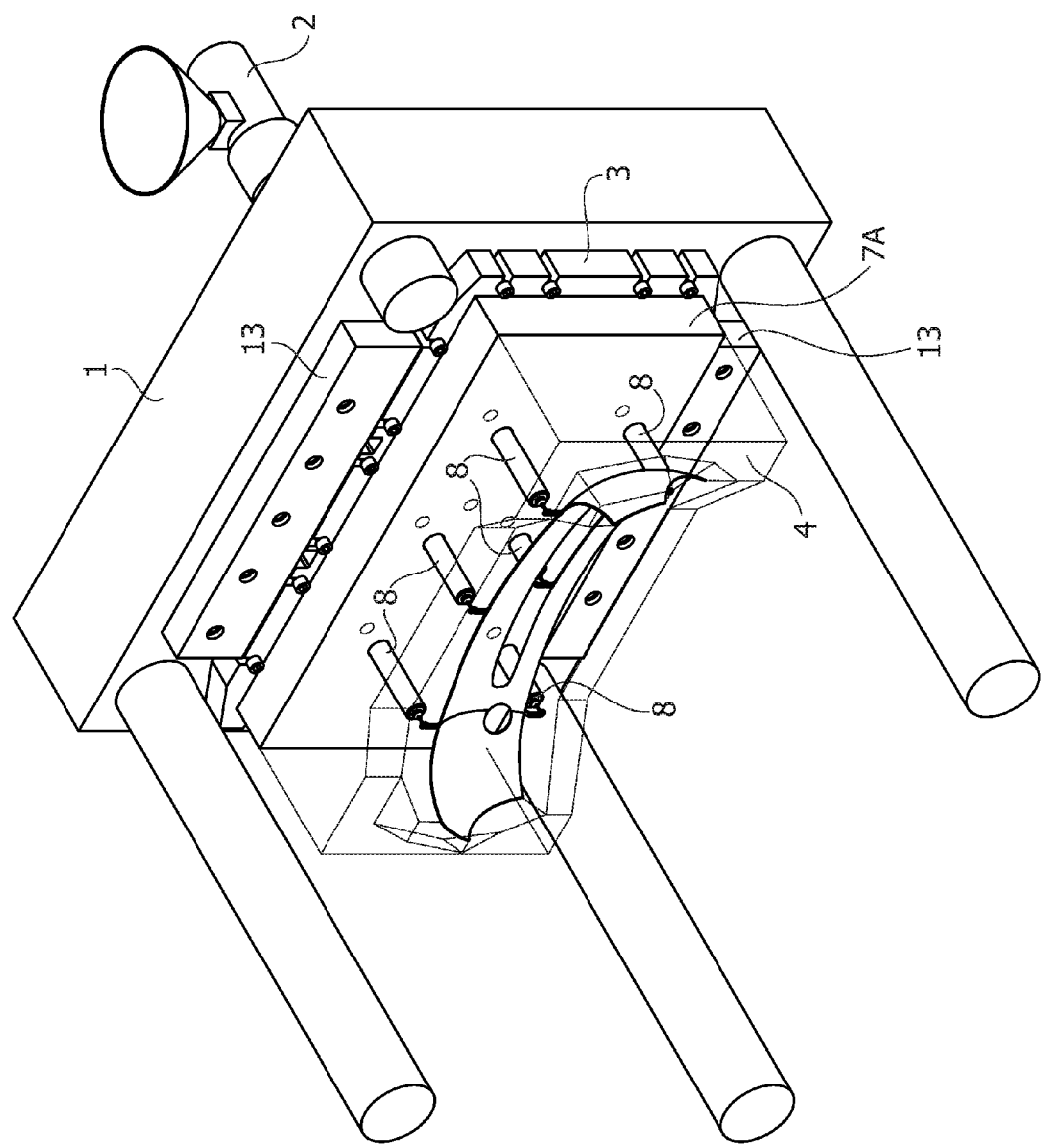
FIG. 1 is a schematic front perspective view of a part of an apparatus for injection molding of plastic materials according to a first embodiment of the invention.
Figure 5:
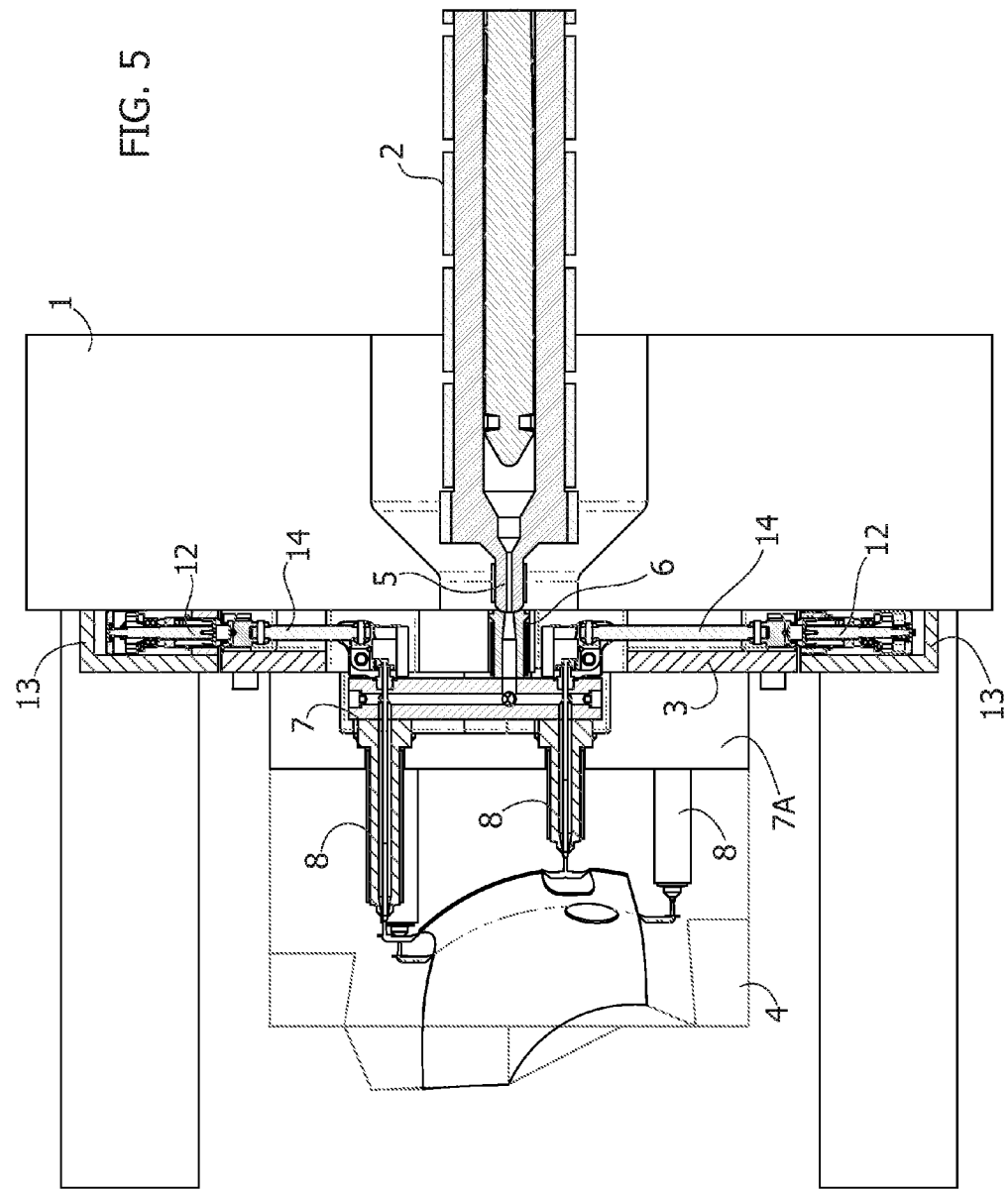
FIG. 5 is a cross-sectional view on a larger scale according to the line V-V of FIG. 4.

FIG. 1 schematically shows the essential components of an apparatus for injection molding of plastic materials according to a first embodiment of the invention. In a manner generally known per se, the apparatus comprises an injection machine platen 1, fixed or movable, connected to a plasticization unit partially indicated by 2, for supplying the plastic material to be injected. A backing plate or clamping plate 3 is fixed to the injection machine platen 1 of a mold 4, whose matrix is represented schematically. The plastic material in the fluid state, coming from the plasticization unit 2, is fed through a hole 5 (FIG. 5) of the injection machine platen 1 and a hole 6 of the backing plate 3, to a distributor or hot runner 7, connected to the backing plate 3 through a plate of the distributor 7A ("manifold plate"). The distributor 7 bears one, or as in the case of the example illustrated, a plurality of injectors 8 for injecting the plastic material into the cavity of the mold 4.

Figure 2:
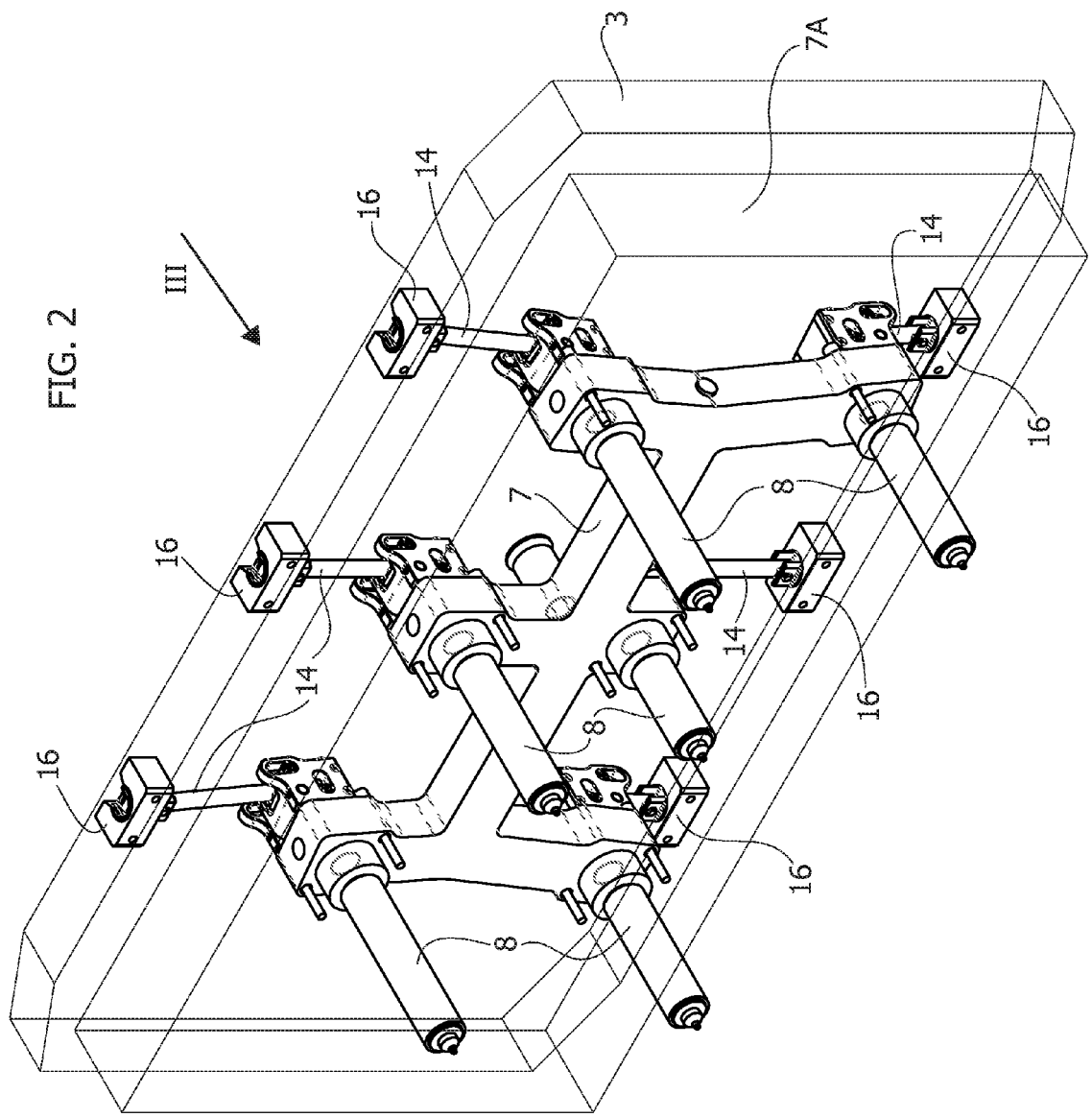
FIG. 2 is an analogous view to FIG. 1, on a larger scale, in which some parts of the molding apparatus are clearly shown and others are omitted for simplicity of illustration.
Figure 3:
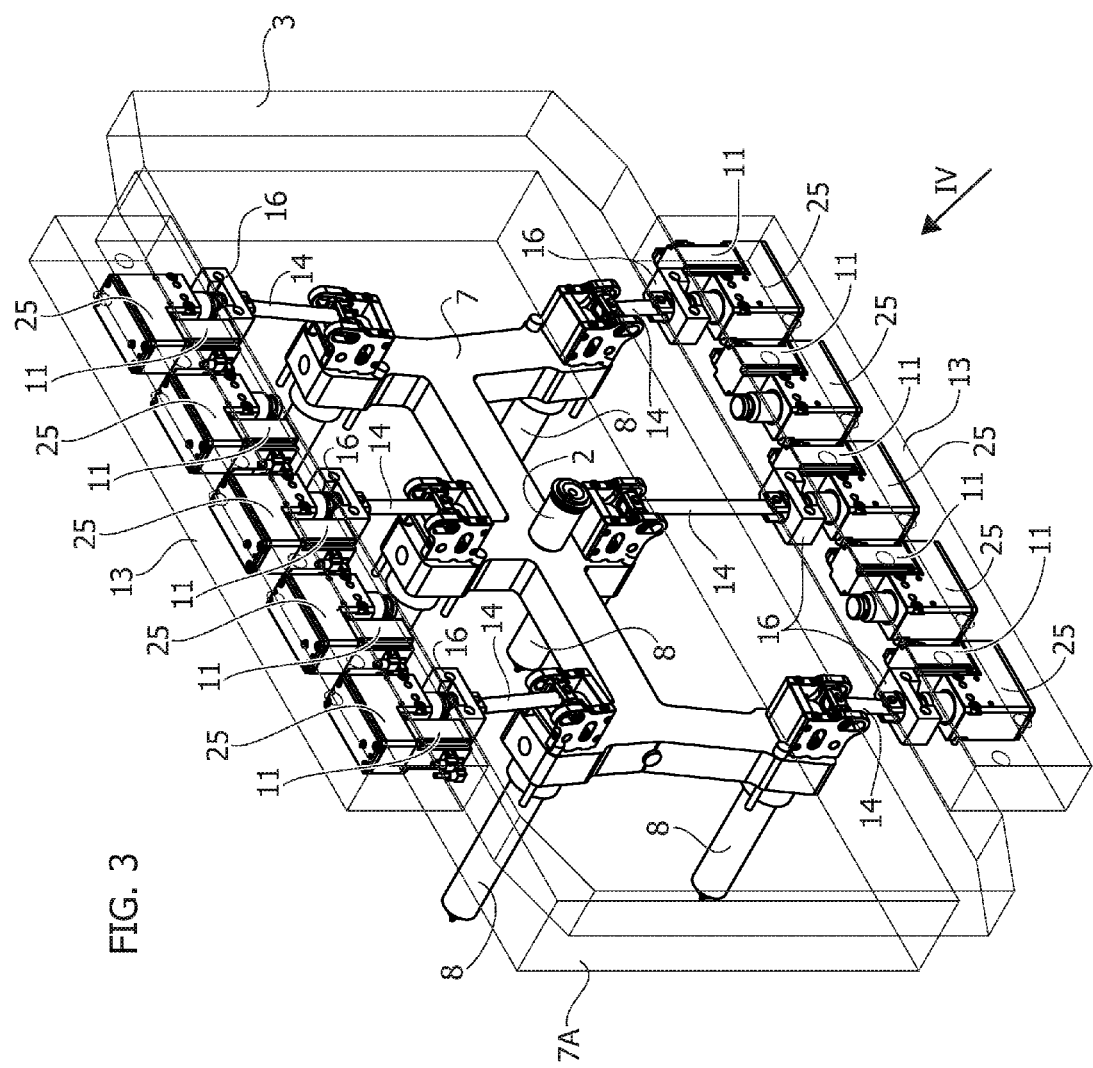
FIG. 3 is a dorsal perspective view according to the arrow III of FIG. 2, according to a different arrangement.
Figure 4:
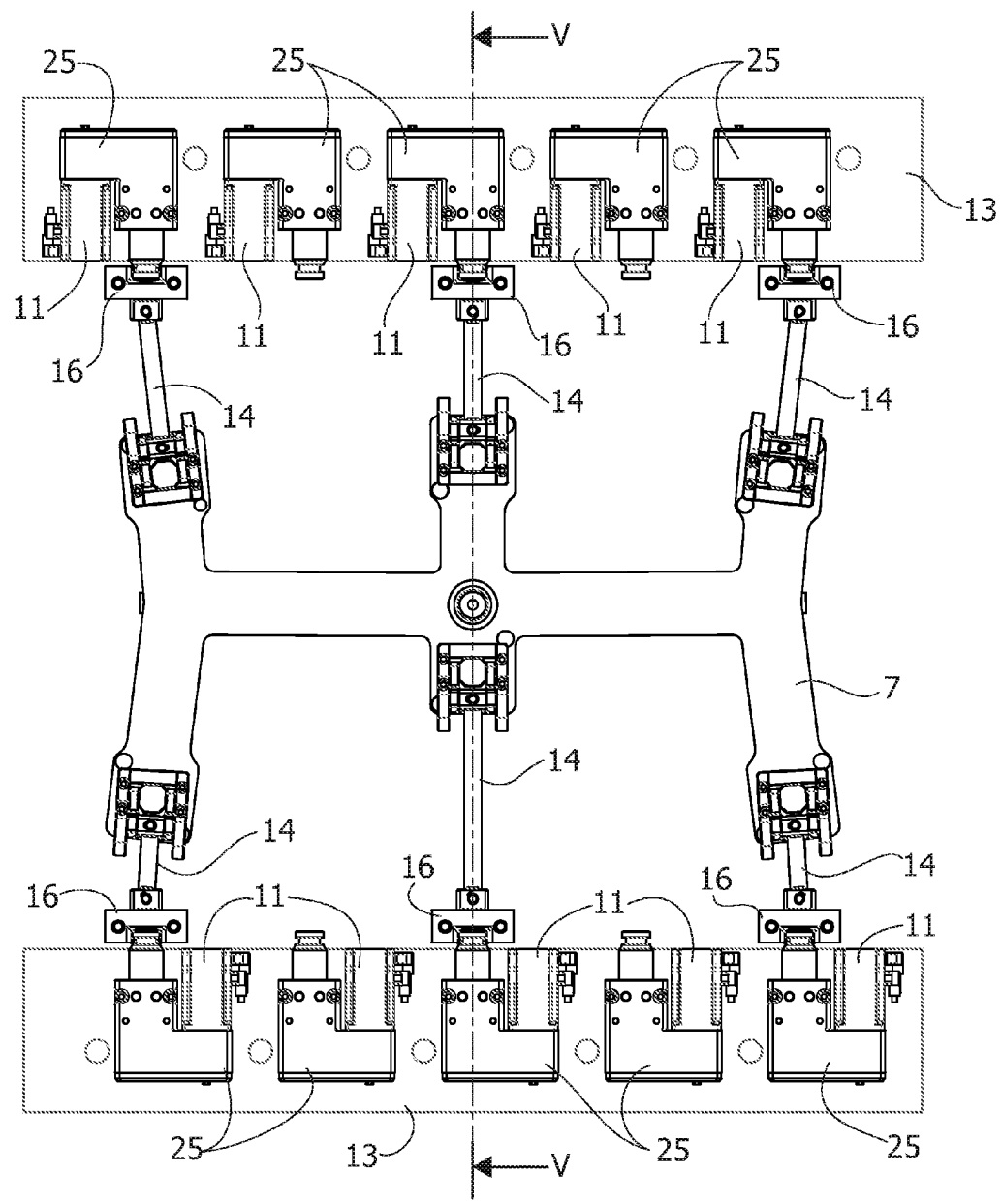
FIG. 4 is a simplified, plan view of FIG. 3.

It should be noted that, for simplicity of illustration, the manifold plate 7A and the backing plate 3 are clearly represented in FIGS. 2 and 3 but have been omitted in FIG. 4.

Figure 6:
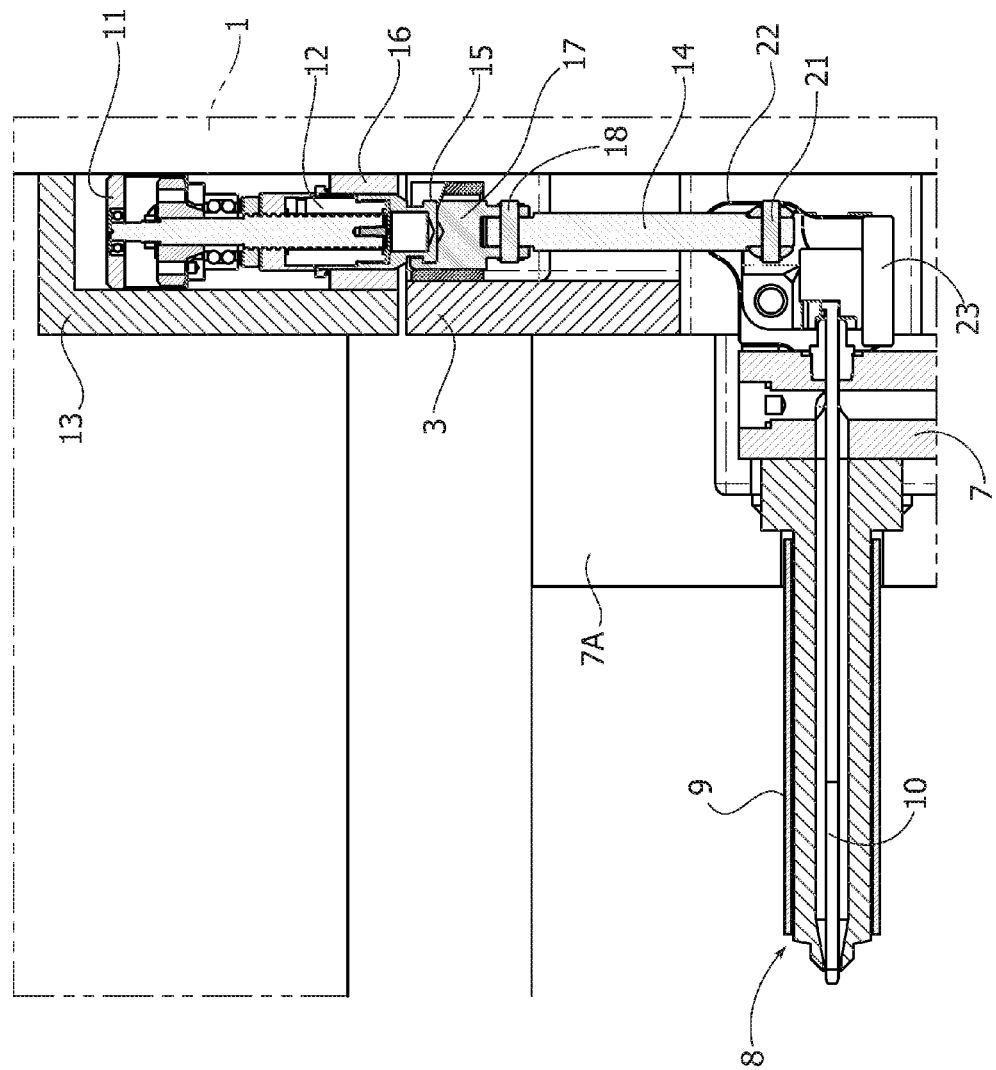
FIG. 6 shows an enlargement of FIG. 5.

As is illustrated in detail in FIG. 6, each injector 8 comprises, in a manner known per se, a nozzle 9 within which a pin valve 10 is axially movable, operated in a controlled manner to move between a forward closed position and a retracted open position to enable fluid plastic material to flow from the distributor 7 to the cavity of the mold 4.

Operation of the pin valve 10 of each injector 8 is achieved through a respective rotary electric motor 11 and associated transmission, better specified below, including a respective screw-and-nut assembly 12.

Each unit formed by the relative rotary electric motor 11 and by the screw-and-nut assembly 12 is, for example, of the type described and illustrated in the already cited document EP-2679374A1: the screw-and-nut assembly 12 is arranged parallel to the side of the rotary electric motor 11, and the screw is driven in rotation, for example by means of a multiplier gearbox, so as to move the nut in one direction or in the opposite direction, thus controlling, correspondingly, the advancing and retracting of the pin valve 10 of the injector 8.

Each electric motor 11 is controlled by an electronic unit, which operates the control of the position and of the speed of opening/closing of the relative pin valve 10, for example, with sequential modes in the case of molds for the production of large pieces.

Typically, in the currently known injection molding apparatuses, the electric actuators are carried by the distributor 7, as in the case of the already cited document EP-2679374A1, or by the backing plate of the mold but in the immediate proximity of the relative injectors 8, as in the case of the already cited European patent application no. 14170508.7.

According to the unique characteristic of the present invention, the electric actuators, or rather, the rotary electric motors 11 with the relative screw-and-nut assemblies 12, actuate the injectors 8 by means of respective connecting rods 14 with variable lengths, i.e. selectable according to the arrangement and the distance of the injectors 8 carried by the distributor 7. In this way, as will be seen, the rotary electric motors 11 and the screw-and-nut assemblies 12 can be placed in peripheral positions and, in any case, distant from the cavity of the mold 4.

In the embodiment described herein, each rotary electric motor 11, with the respective screw-and-nut assembly 12, forms a unit 25, possibly pre-assembled with the relative connecting rod 14, and directly or indirectly carried by the injection machine platen 1. In this case, the units 25 are therefore independent and separate, relative to the backing plate 3 and the distributor 7, or rather, relative to the mold 4 as a whole and define, as a complex, a piece of equipment able to be permanently installed on board the molding apparatus to be able to be used with different molds, also in relation to the number and the arrangement of the relative injectors, possibly by simply replacing the connecting rods 14 with others of different lengths. As seen in FIGS. 3 and 4, the number of units 25 carried by the injection machine platen 1 can also be redundant for use with certain molds, so that they can easily be adapted to a different mold, for example having a great number of injectors, or even the same number or a smaller number of injectors arranged in a different way.

As noted above, the fixing of each unit 25 (rotary electric motor 11/screw-and-nut assembly 12) relative to the injection machine platen 1 can be direct or indirect: in the case of the illustrated example, two hollow supports 13, within which two opposing rows of units 25 are housed, are fixed peripherally to the front side of the injection machine platen 1, on opposite sides with respect to the backing plate 3 of the mold 4. Different arrangements are also possible, for example, arranging the units 25 along the entire perimeter of the injection machine platen 1, or rather, in four rows along the four sides of the injection machine platen 1.

The variation in length of each connecting rod 14 present could be achieved, instead of replacing it with a different-length rod 14, by means of a telescopically extendable and shortenable configuration, which is then lockable at the required length. This configuration, for example, of the screw-and-nut type, is not illustrated in detail, as it is within the scope of those skilled in the art.

The connecting rods 14 are moveable within recesses of the backing plate 3, along a direction that may not necessarily parallel to the axis of the screw-and-nut assembly 12, or rather, forming an angle with this axis in the manner, for example, visible in FIG. 4. However, as will be seen, it is preferable that each connecting rod 14 is axially aligned with the relative screw-and-nut assembly 12 and with the respective rocker lever 22.

According to a further unique aspect of the invention, each connecting rod 14 is connectable on one side to the screw-and-nut assembly 12 and on the other to the distributor 7 through quick-hooking means, which ensures extreme ease and speed of installing the mold 4 on board the molding apparatus.

Referring in greater detail to FIGS. 7 and 8, the nut of the assembly 12 is formed with a mushroom-shaped head 15 that passes through a block 16 for securing to the support 13 of the fixed injection machine platen 1, with which a complementary securing element 17 is engaged, connected with a joint, by a pin 18, to one end 19 of the connecting rod 14. The other end of the connecting rod 14, indicated by 20, is in turn connected by a pin 21 to a rocker lever 22 carried by a bracket 23 fixed to the distributor 7 and, in turn, connected to the top of the pin valve 10. This connection, not illustrated in detail, can be, for example, of the type described and illustrated in the already cited document EP-2679374A1.

FIGS. 9A-9C exemplify the quick-hooking modes between the securing element 17 of the connecting rod 14 and the mushroom-shaped head 15 of the screw-and-nut assembly 12 during the assembly and the subsequent clamping of the mold 4 to the injection machine platen 1. As can be seen, this coupling is achieved following the frontal juxtaposition of the backing plate 3 to the injection machine platen 1.

Figure 10:
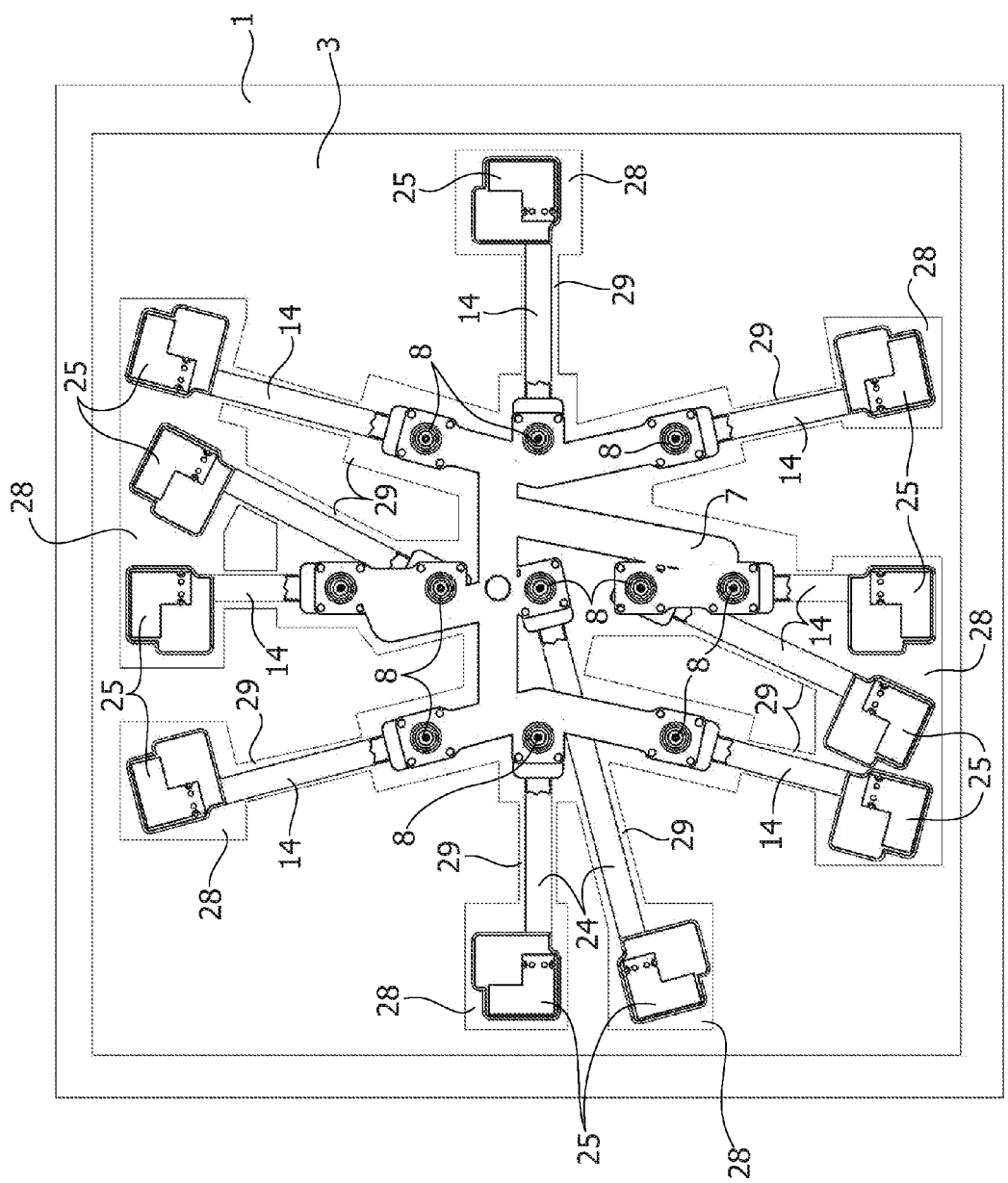
FIG. 10 is a simplified front elevational view showing a second embodiment of the invention.
Figure 11:
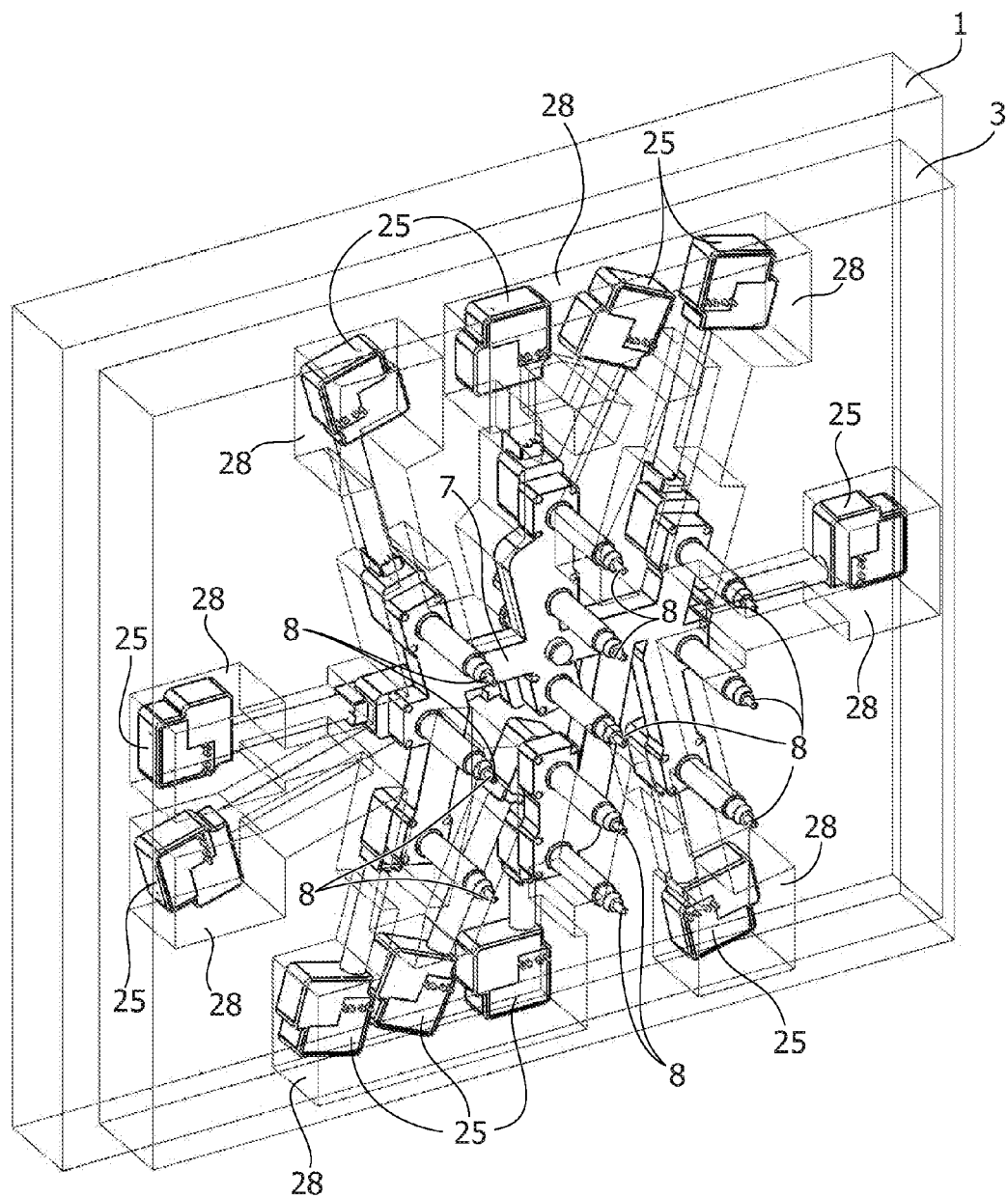
FIG. 11 is an isometric view of FIG. 10.
Figure 12:
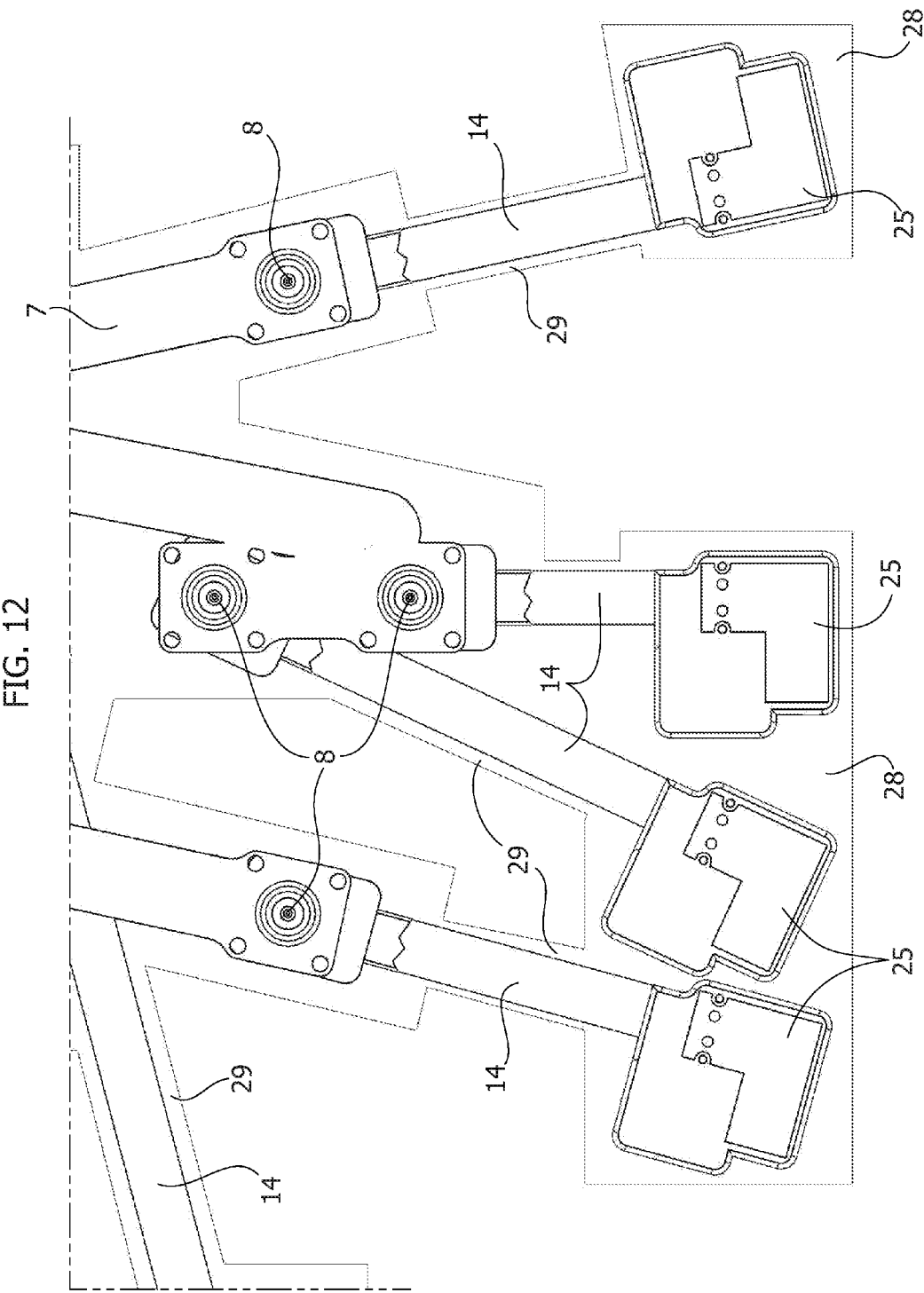
FIG. 12 shows a part of FIG. 10 on an enlarged scale.

The variant represented in FIGS. 10-12 shows the alternative arrangement according to which the units 25 are carried by the backing plate 3 of the mold 4, instead of by the injection machine platen 1. In this case, each rotary electric motor 11 with the respective screw-and-nut assembly 12 is housed in a peripheral recess 28, with the relative connecting rod 14, which extends within a groove 29 of the backing plate 3 for connecting to the corresponding injector 8.

As mentioned previously, it is preferable that the connecting rods 14 are coaxial with the screw-and-nut assemblies 12 and with the rocker levers 22. In this case, the rotary electric motor 11/screw-and-nut 12 assemblies are angularly oriented in a corresponding manner.

A similar arrangement is envisaged in the variant represented in FIGS. 13-16, again referring to the case of applying the units 25 (rotary electric motor 11/screw-and-nut assembly 12) to the injection machine platen 1.

Figure 16:
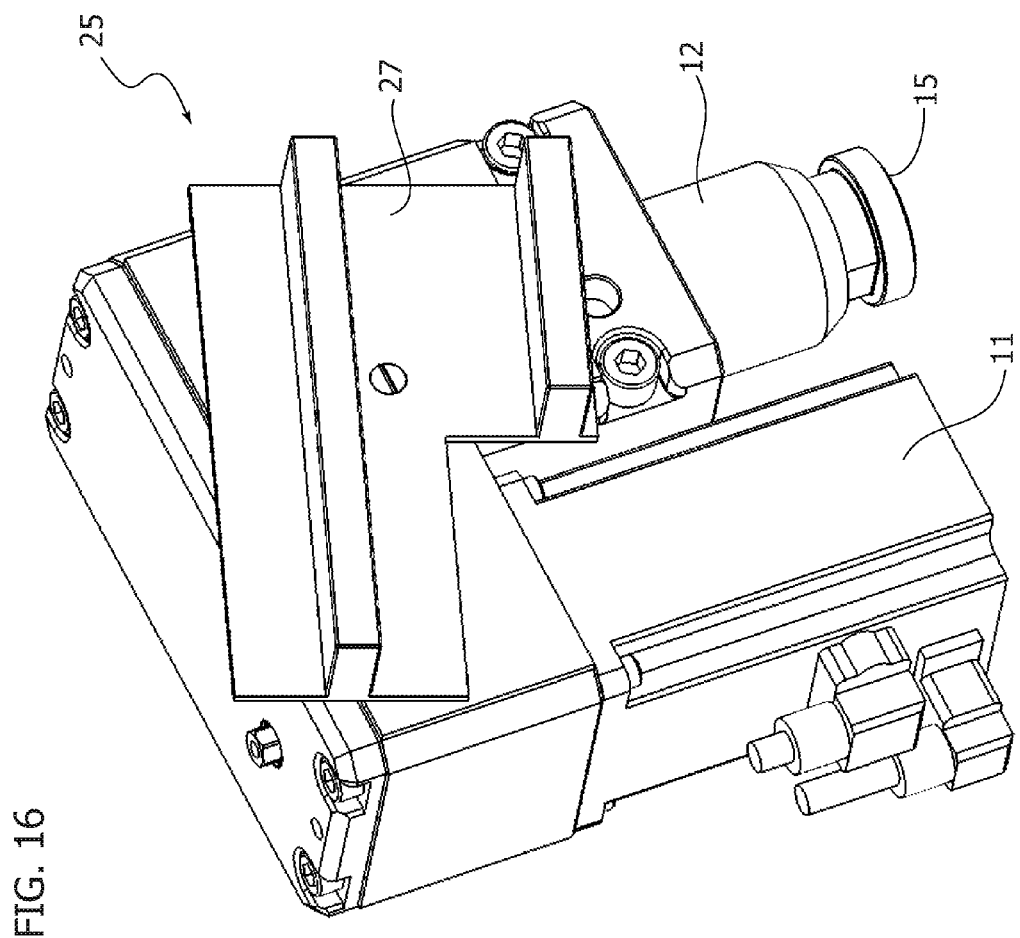
FIG. 16 is a perspective view on a larger scale of a detail of the embodiment of FIGS. 13-15.

In this variant, the supports 13, fixed peripherally to the injection machine platen 1 on opposite sides with respect to the backing plate 3 of the mold 4, bear respective supporting guides 26 on which the units 25 are selectively movable and orientable. As is best seen in FIG. 16, the inner side of each unit 25 is rotatable on a fitting 27, in turn slidable on the supporting guide 26 and then lockable in the selected position.

Figure 13:
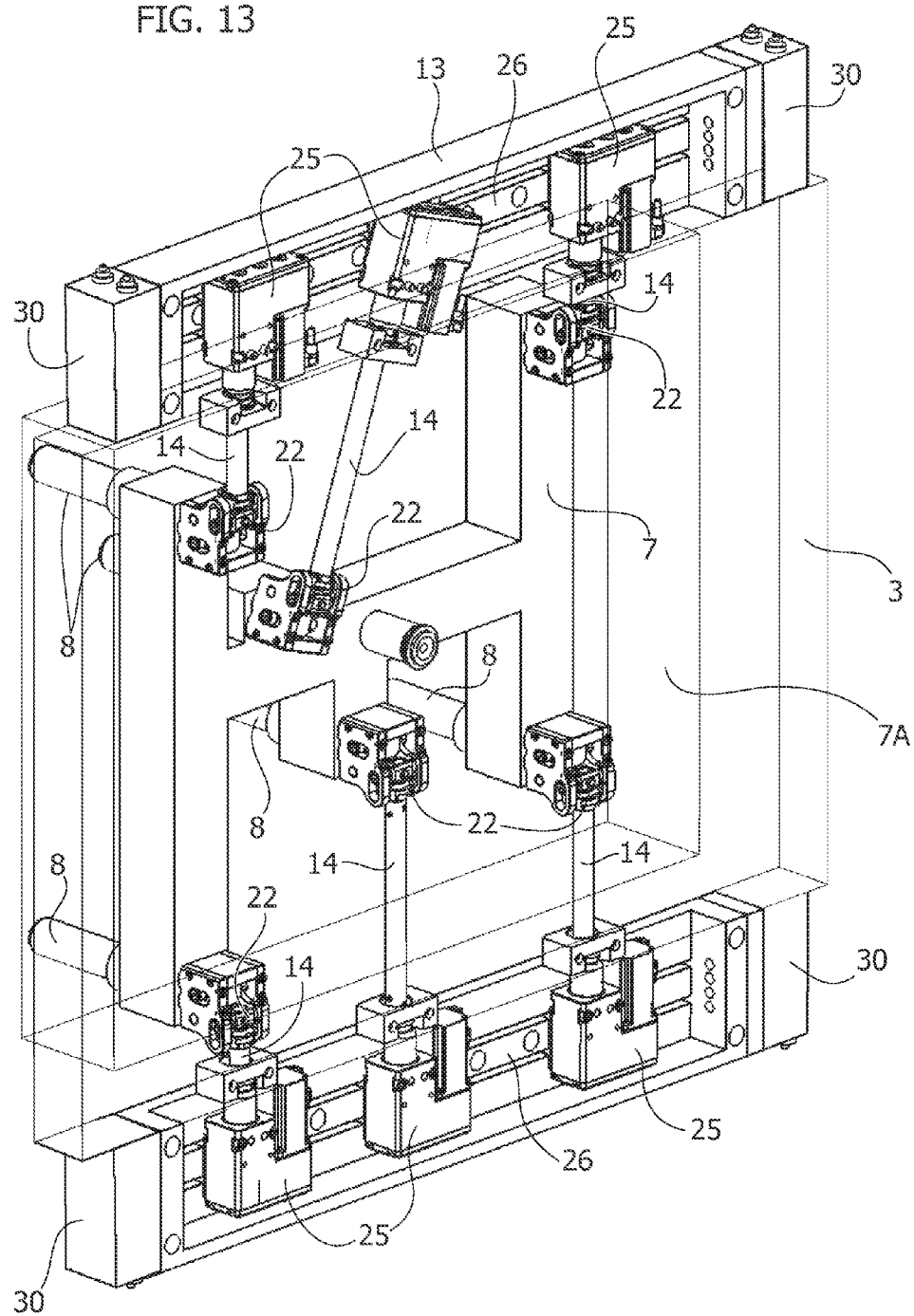
FIG. 13 shows a variant of FIG. 3.
Figure 14:
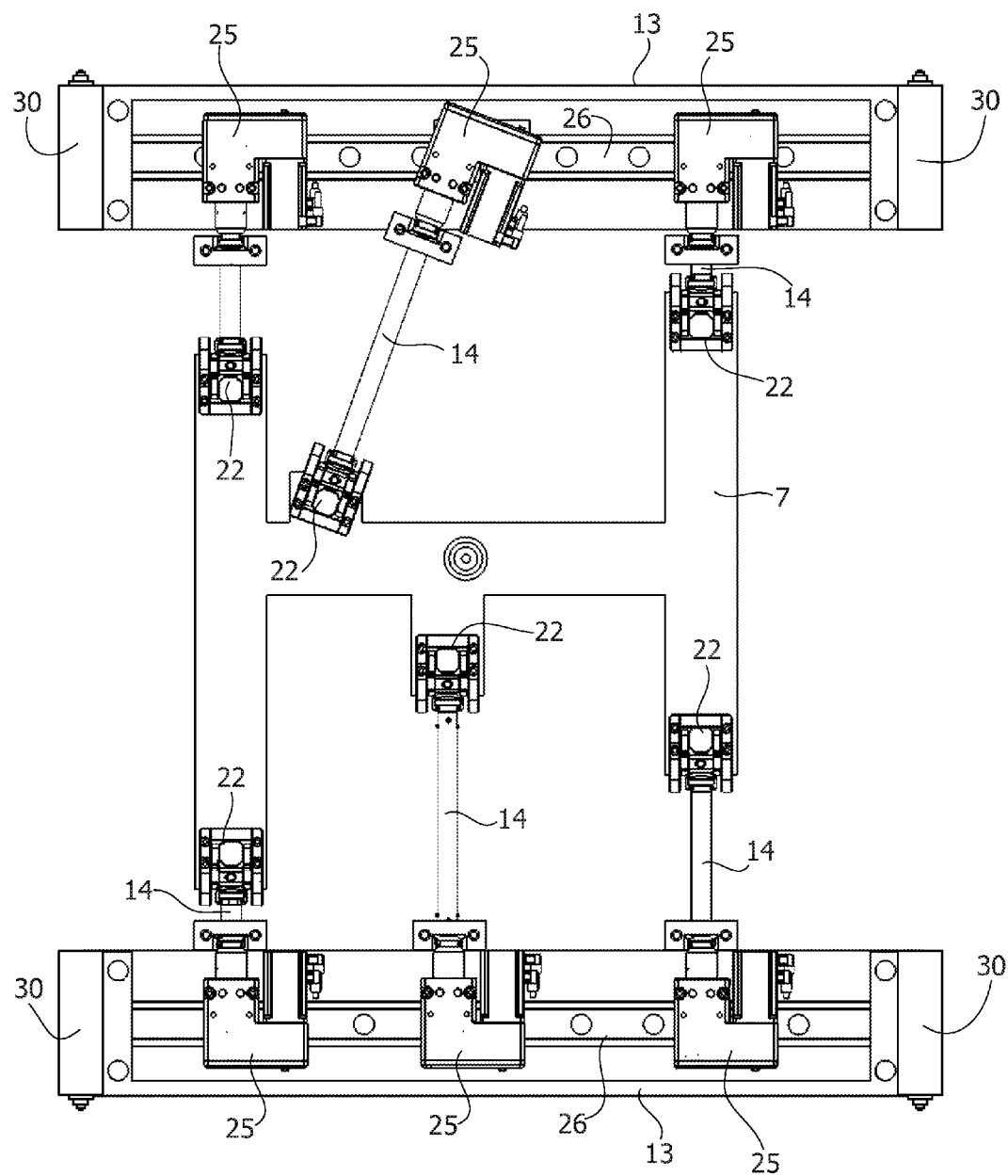
FIG. 14 is a simplified front elevational view of FIG. 13.
Figure 15:
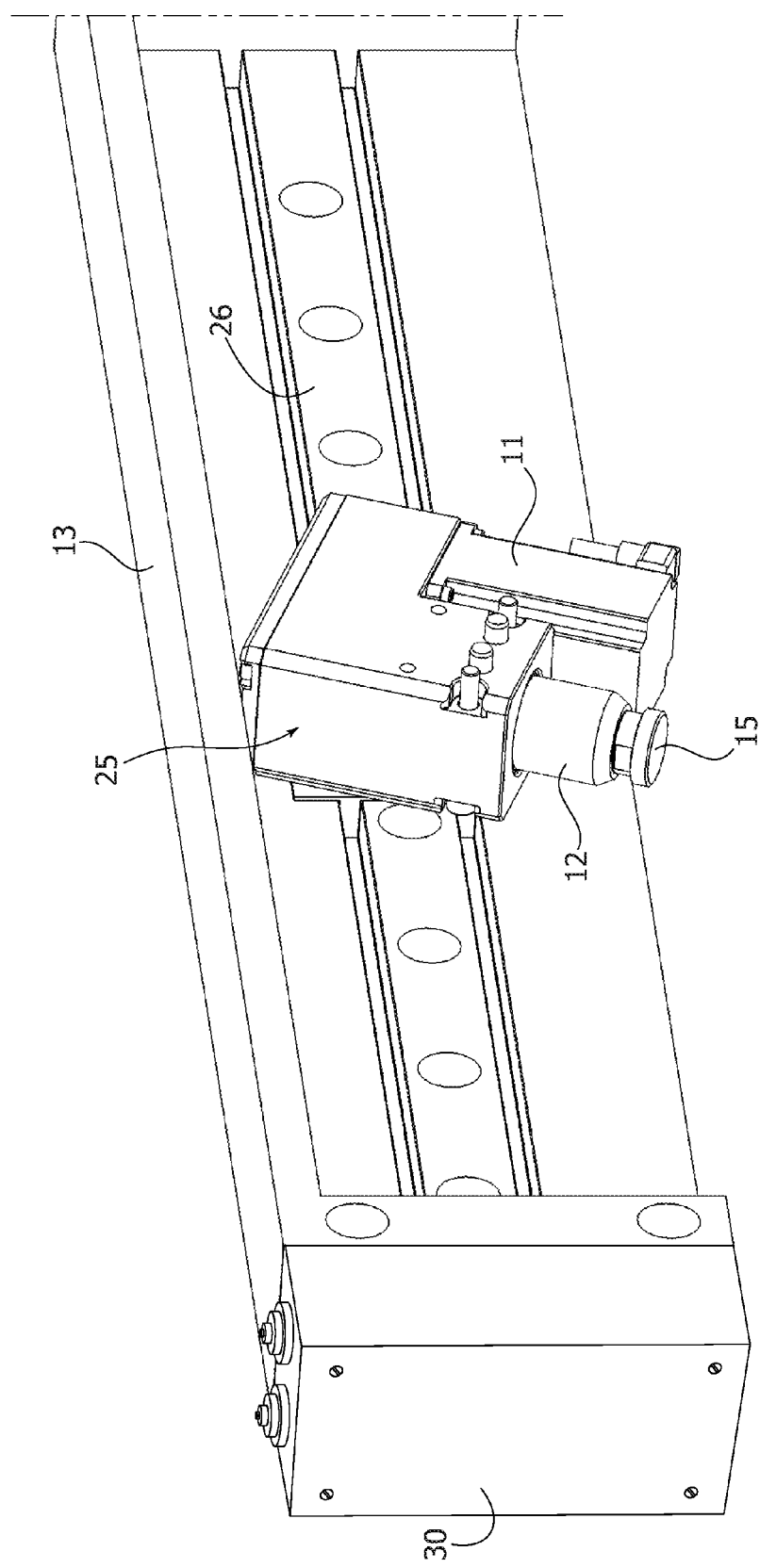
FIG. 15 shows a detail of FIG. 13 on an enlarged scale.

As is illustrated in detail in FIGS. 13-15, containment boxes 30 are provided at the ends of the supports 13, for the electrical connections of the rotary motors 11 of the units 25. In this way, these electrical connections are advantageously grouped together, reducing the encumbrances and facilitating the connection to the electronic control unit of the molding apparatus. It will become apparent that the electric actuators permanently applied to the injection machine platen 1 facilitate the use of different and simplified molds, as these are, in fact, devoid of actuators, and thus simpler and cheaper. It is reiterated that the electric actuators mounted on the injection machine platen 1 constitute a piece of equipment usable indifferently with diverse molds, which are obviously suitably arranged.

Even in the case in which the electric actuators are applied to the backing plate 3 of the mold 4, the overall structure of the mold itself will have a greater rigidity, as well as being simplified further, due to the absence of electrical cables for connecting to the actuators.

A further advantage lies in the fact that the electric actuators, no longer exposed to the high temperatures of the distributor, do not require conditioning systems for their cooling. Also, the risk of damage of the electric actuators in the event of leakage of plastic material by the distributor is, in practice, eliminated.

Of course, the details of construction and the embodiments may be widely varied from what is described and illustrated, without thereby departing from the scope of the present invention, as defined by the following claims. Thus, although the invention has been described with reference to a mold equipped with a plurality of injectors, it is equally advantageously applicable to the case of single injectors.

The invention claimed is:

1. An apparatus for injection molding of plastic materials including an injection machine platen, a mold comprising a backing plate for securing the mold to the injection machine platen, a distributor of the plastic material to be injected, bearing a plurality of injectors with each injector of the plurality of injectors including a nozzle within which a pin valve is axially movable, and a respective electric actuator and associated transmission to operate displacement of the pin valve between a closed condition and an open condition to enable fluid plastic material under pressure to flow from the distributor to a cavity of the mold, wherein each transmission includes a connecting rod and the connecting rod has a variable length so as to accommodate different distances between each pin valve and its respective electric actuator, and wherein the plurality of injectors are operable independently of each other.

2. The apparatus according to claim 1, wherein each electric actuator is carried by the injection machine platen.

3. The apparatus according to claim 2, wherein each electric actuator is carried by a support of the injection machine platen arranged laterally to the backing plate of the mold and in that said respective variable-length connecting rod extends through the backing plate.

4. The apparatus according to claim 1, wherein each electric actuator is carried by the backing plate of the mold and said respective variable-length connecting rod extends through said backing plate.

5. The apparatus according to claim 1, wherein each electric actuator is a rotary electric motor and each transmission comprises a screw-and-nut assembly to convert rotation of an electric motor shaft into a translation, and a rocker lever driven by said screw-and-nut assembly through its respective variable-length connecting rod to displace its respective pin valve.

6. The apparatus according to claim 5, wherein each connecting rod is axially aligned with its respective screw-and-nut assembly and rocker lever.

7. The apparatus according to claim 6, wherein each rotary electric motor and screw-and-nut assembly and the connecting rod form a selectively movable and orientable unit.

8. The apparatus according to claim 7, further comprising one or more supporting guides of said unit, which is provided with a fitting configured to be slidably and rotatably mounted on said one or more supporting guides and then locked in the selected position.

9. The apparatus according to claim 3, wherein said support of the injection machine platen unit includes at least one box containing the electrical connections of the rotary electric motors carried by said support.

10. The apparatus according to claim 5, wherein each connecting rod is connectable to its respective screw-and-nut assembly by a quick-hooking arrangement.

11. The apparatus according to claim 5, wherein said rocker lever is carried by the distributor.

12. An apparatus for injection molding of plastic materials including an injection machine platen, a mold comprising a backing plate for securing the mold to the injection machine platen, a distributor of the plastic material to be injected, bearing a plurality of injectors with each injector of the plurality of injectors including a nozzle within which a pin valve is axially movable, and a respective electric actuator and associated transmission to operate displacement of the pin valve between a closed condition and an open condition to enable fluid plastic material under pressure to flow from the distributor to a cavity of the mold, wherein the transmissions include variable-length connecting rods having different lengths to accommodate different distances between the pin valves and electric actuators, and wherein the plurality of injectors are operable independently of each other.

* * * * *